United States Patent
Sahara et al.

(10) Patent No.: US 7,947,169 B2
(45) Date of Patent: May 24, 2011

(54) METHOD OF RECOVERING VOLATILE ORGANIC COMPOUND AND VOLATILE ORGANIC COMPOUND RECOVERY SYSTEM

(75) Inventors: Wataru Sahara, Yokohama (JP); Shunji Nario, Kagoshima (JP); Ichirou Nakagama, Kagoshima (JP); Koichi Iwamoto, Kagoshima (JP)

(73) Assignees: Nippon Oil Corporation, Minato-ku, Tokyo (JP); Nippon Oil Staging Terminal Co., Ltd., Kagoshima (JP)

( * ) Notice: Subject to any disclaimer, the term of this patent is extended or adjusted under 35 U.S.C. 154(b) by 8 days.

(21) Appl. No.: 11/992,732

(22) PCT Filed: Aug. 23, 2006

(86) PCT No.: PCT/JP2006/316492
§ 371 (c)(1),
(2), (4) Date: Aug. 14, 2009

(87) PCT Pub. No.: WO2007/039993
PCT Pub. Date: Apr. 12, 2007

(65) Prior Publication Data
US 2009/0294331 A1    Dec. 3, 2009

(30) Foreign Application Priority Data
Sep. 30, 2005  (JP) ................ P2005-288353

(51) Int. Cl.
*C10G 25/00*  (2006.01)
(52) U.S. Cl. ......... 208/299; 208/177; 208/46; 208/101; 208/100
(58) Field of Classification Search ............ 208/299
See application file for complete search history.

(56) References Cited

U.S. PATENT DOCUMENTS
5,678,423 A * 10/1997 Davies et al. ............... 62/613

FOREIGN PATENT DOCUMENTS
JP          50-90606          7/1975

OTHER PUBLICATIONS

Crude Oil Explained by Oil and Gas News, p. 2, posted May 12, 2009 <http://www.oilandgaspress.com/wp/2009/05/12/cruce-oil-explained/>.*
Perry, R.H.; Green, D.W. (1997). Perry's Chemical Engineers' Handbook (7th Edition).. McGraw-Hill. Online version available at: http://knovel.com/web/portal/browse/display?_EXT_KNOVEL_DISPLAY_bookid=48&VerticalID=0.*
International Preliminary Examination Report.
International Search Report.
O. Huglen et al., "Reduction VOC Emissions from Large Crude Carriers," *Proc. Annu. Offshore Technol. Conf.* 2001, vol. 3, pp. 563-570.
Petroleum Handbook, Nippon Oil Corporation, 1988 p. 462.
Sekiyu Jiten, Maruzen Co., Ltd., 1989, Nen 3 Gatsu 20 Nichi Hakko, pp. 382-383.
International Preliminary Examination Report, 2008.
International Search Report, 2007.

* cited by examiner

*Primary Examiner* — Glenn A Caldarola
*Assistant Examiner* — Michelle L Stein
(74) *Attorney, Agent, or Firm* — Finnegan, Henderson, Farabow, Garrett & Dunner, LLP

(57) ABSTRACT

A gas generated from a first crude oil and containing volatile organic compounds and a second crude oil are supplied to an absorber 16, thereby absorbing the volatile organic compounds in the gas into the second crude oil.

13 Claims, 1 Drawing Sheet

METHOD OF RECOVERING VOLATILE ORGANIC COMPOUND AND VOLATILE ORGANIC COMPOUND RECOVERY SYSTEM

This application is the National Stage Entry of Application No. PCT/JP2006/316492, filed Aug. 23, 2006, which claims the priority of Japanese Application No. 2005-288356, filed Sep. 30, 2005.

TECHNICAL FIELD

The present invention relates to a method for recovering volatile organic compounds and a recovery system for volatile organic compounds.

BACKGROUND ART

A gas containing volatile organic compounds (VOCs) such as hydrocarbons is generated from, for example, an off-shore crude oil tanker on loading the crude oil from a ground crude oil tank to the crude oil tanker. When crude oil is loaded to the crude oil tanker, the gas within the crude oil tanker is expelled. The gas inside the crude oil tanker is a gas generated from crude oil, and contains volatile organic compounds. The gas containing volatile organic compounds is generally emitted to atmosphere via a crude oil tanker-stack called the "vent".

Further there is known a combustor which treats the gas containing volatile organic compounds by combustion. That type of combustor includes flare-stack and ground-flare. (Refer to Non-patent document 1.)

[Non-patent document 1] "Petroleum Handbook", p. 462, (1988), edited by Nippon Oil Co., Ltd.

DISCLOSURE OF THE INVENTION

Problems to be Solved by the Invention

If, however, a gas containing volatile organic compounds is emitted to atmosphere, there may arise problems of mal-odor and the like. Furthermore, combustion of all of the gas containing volatile organic compounds is unfavorable in view of effective use of resources. In addition, there may induce generation of large amounts of carbon dioxide ($CO_2$) which is a greenhouse gas and of nitrogen oxides (NOx) which are air pollutants.

In this regard, an object of the present invention is to provide a method for recovering volatile organic compounds and a recovery system for volatile organic compounds, which method and system can suppress the emissions of volatile organic compounds to atmosphere and allows effective use of resources.

Means for Solving the Problems

To solve the above problems, the method for recovering volatile organic compounds according to the present invention has the step of supplying a gas which is generated from a first crude oil and which contains volatile organic compounds, and a second crude oil, to an absorber, thereby absorbing the volatile organic compounds in the gas into the second crude oil.

According to the method for recovering volatile organic compounds of the present invention, the volatile organic compounds can be absorbed by the second crude oil in the absorber, thereby suppressing the emissions of volatile organic compounds to atmosphere and allowing effective use of resources.

The above method for recovering volatile organic compounds preferably further contains the step of circulating the second crude oil between the absorber and a crude oil supply source to supply the second crude oil. With the additional step, the second crude oil can be effectively used.

Furthermore, it is preferable that the second crude oil has the API gravity in a range from 18 to 45. Here, the API gravity is expressed by the following formula (1). When the API gravity exceeds 45, the amount of light fractions in the second crude oil becomes excessive so that the absorption efficiency of the volatile organic compounds tends to decrease. If the API gravity is smaller than 18, the profitability trends to decrease.

$$\text{API gravity} = 141.5/G - 131.5 \tag{1}$$

The symbol G in the formula (1) designates the specific gravity of petroleum at 15.6° C. (60° F.). The "specific gravity" referred to herein signifies the specific gravity determined in accordance with JIS K2249 "Crude petroleum and petroleum products—Determination of density and petroleum measurement tables."

The recovery system for volatile organic compounds according to the present invention has an absorber to which a gas which is generated from a first crude oil and which contains volatile organic compounds, and a second crude oil, are supplied, thereby absorbing the volatile organic compounds in the gas into the second crude oil.

According to the recovery system for volatile organic compounds of the present invention, the volatile organic compounds can be absorbed by the second crude oil in the absorber, thereby suppressing the emissions of volatile organic compounds to atmosphere and allowing effective use of resources.

Effect of the Invention

The present invention provides a method for recovering volatile organic compounds and a recovery system for volatile organic compounds, which method and system can suppress the emissions of volatile organic compounds to atmosphere and allows effective use of resources.

EXPLANATION OF SYMBOLS

Figure 1:
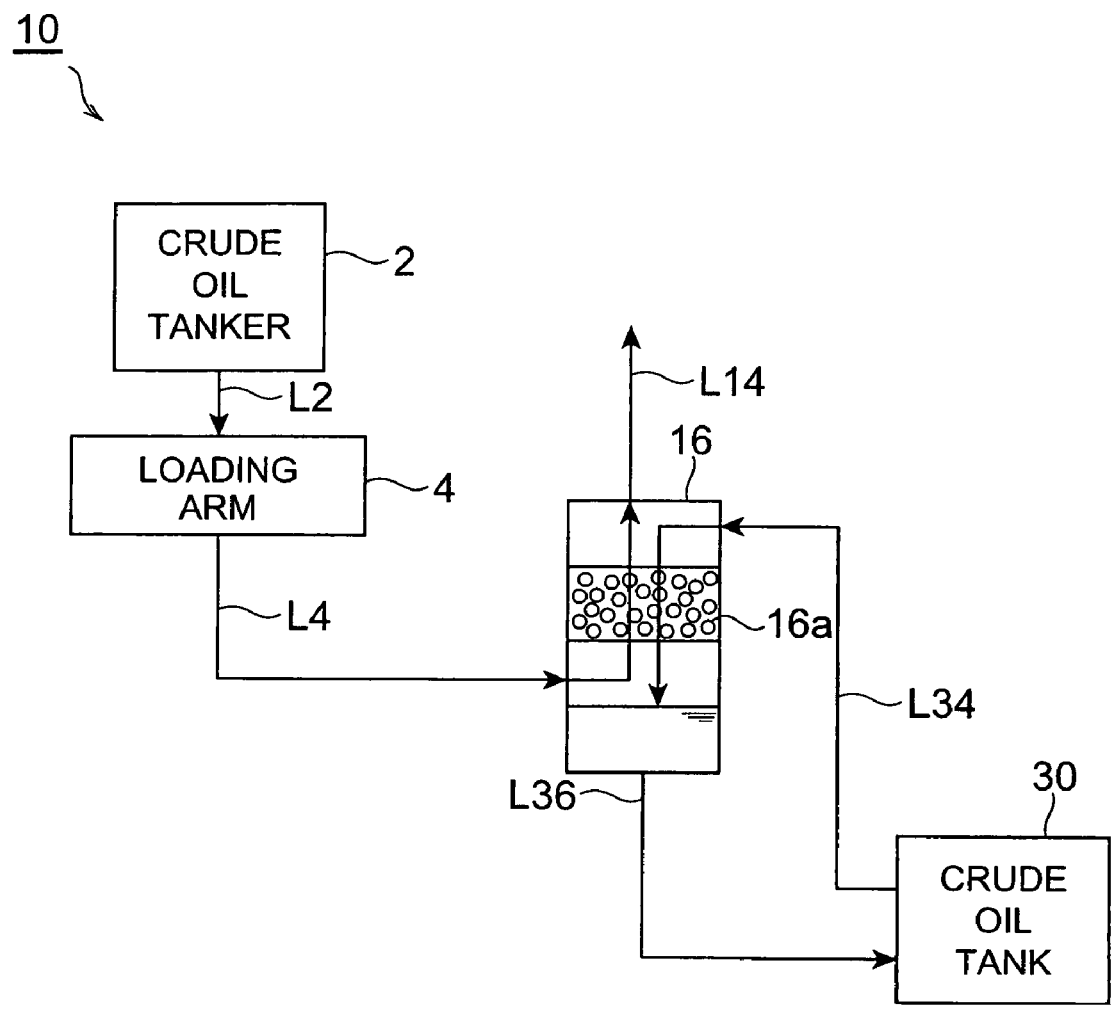
FIG. 1 is a block diagram illustrating the recovery system for volatile organic compounds, relating to the embodiment.

2: a crude oil tanker, 10: a recovery system for volatile organic compounds, 16: an absorber, 30: a crude oil tank (a crude oil supply source).

BEST MODES FOR CARRYING OUT THE INVENTION

The embodiment of the present invention is described in detail below referring to the drawing. In the description of the drawing, same or equivalent elements use the same symbol, and duplicated explanation will be omitted.

FIG. 1 is a block diagram schematically illustrating the recovery system for volatile organic compounds, relating to the embodiment. Examples of volatile organic compounds are C1-C7 hydrocarbons. A recovery system 10 for volatile organic compounds given in FIG. 1, (hereinafter referred to simply as the "recovery system 10"), has an absorber 16. To the absorber 16, there is supplied a gas which is generated from the first crude oil and which contains volatile organic compounds, (hereinafter referred to simply as the "gas G"), from, for example, a crude oil tanker 2. Examples of the first crude oil are Arabian light crude oil, Sumatra light crude oil, and Iranian heavy crude oil. In an example, the component ratios of volatile organic compounds in the gas G are the following.

$CH_4$: 0.7% by volume
$C_2H_6$: 4.8% by volume
$C_3H_8$: 26.9% by volume
$C_4H_{10}$: 39.4% by volume
$C_5H_{12}$: 21.2% by volume
$C_6H_{14}$: 6.7% by volume
$C_7H_{16}$: 0.3% by volume In addition, to the absorber 16, the second crude oil is supplied from, for example, a crude oil tank 30 (a crude oil supply source). Due to this, within the absorber 16, the volatile organic compounds in the gas G are absorbed into the second crude oil. Examples of the second crude oil are Arabian light crude oil, Sumatra light crude oil, and Iranian heavy crude oil.

The API gravity of the second crude oil is preferably in a range from 18 to 45, more preferably from 19 to 42, and most preferably from 20 to 40. Here, the API gravity is expressed by the following formula (1). When the API gravity exceeds 45, the amount of light fractions in the crude oil becomes excessive so that the absorption efficiency of the volatile organic compounds tends to decrease. If the API gravity is smaller than 18, the profitability trends to decrease.

$$API\ gravity = 141.5/G - 131.5 \quad (1)$$

The symbol G in the formula (1) designates the specific gravity of oil at 15.6° C. (60° F.). The "specific gravity" referred to herein signifies the specific gravity determined in accordance with JIS K2249 "Crude petroleum and petroleum products—Determination of density and petroleum measurement tables."

The absorber 16 contains a packing 16a such as Raschig rings made of glass, ceramics, stainless steel, and the like. The Raschig rings made of glass or ceramics have excellent corrosion resistance, and the Raschig rings made of stainless steel are difficult to be broken and have excellent mechanical strength. Within the packing 16a, the gas G and the second crude oil contact with each other in gas-liquid contact mode. The gas G and the second crude oil may travel concurrently or counter-currently.

The contact time therebetween is preferably in a range from 10 seconds to 10 minutes, more preferably from 15 seconds to 8 minutes, and most preferably from 20 seconds to 5 minutes. If the contact time is smaller than 10 seconds, the absorption efficiency of volatile organic compounds trends to decrease. On the contrary, if the contact time exceeds 10 minutes, the investment of the absorber 16 tends to increase.

The gas-liquid ratio, (the ratio of the volume of second crude oil at 15° C. to the volume of gas G in standard state (0° C., 1 atm)), is preferably in a range from 10 to 200 $L/Nm^3$, more preferably from 12 to 180 $L/Nm^3$, and most preferably from 15 to 150 $L/Nm^3$. If the gas-liquid ratio is smaller than 10 $L/Nm^3$, the absorption efficiency trends to decrease. If the gas-liquid ratio exceeds 200 $L/Nm^3$, the investment of absorber 16 tends to increase.

The internal temperature of the absorber 16 is preferably 40° C. or below, more preferably 38° C. or below, and most preferably 35° C. or below. If the internal temperature of the absorber 16 exceeds 40° C., a portion of the second crude oil gasifies to trend to decrease the absorption efficiency.

The internal pressure of the absorber 16 is preferably 9.8× $10^4$ Pa (1 $kgf/cm^2$) or higher, more preferably 1.1×$10^5$ Pa or higher, and most preferably 1.2×$10^5$ Pa or higher. If the internal pressure of the absorber 16 is lower than 9.8×$10^4$ Pa, the absorber 16 becomes negative pressure, which induces gasification of a portion of the second crude oil to trend to decrease the absorption efficiency.

Within the recovery system 10, when loading the crude oil to, for example, the crude oil tanker 2, the gas G containing volatile organic compounds is expelled from the crude oil tanker 2. The gas G is generated from the first crude oil such as a crude oil which was loaded to the crude oil tanker 2 in preceding loading operation, or a crude oil being loaded to the crude oil tanker 2.

The crude oil tanker 2 is preferably connected to a loading arm 4 by a pipe L2 in a closed system. In that case, no leakage of gas G to atmosphere occurs. In addition, the loading arm 4 is preferably connected to the absorber 16 by a pipe L4.

Meanwhile, the crude oil tank 30 is preferably connected to the absorber 16 via a pipe L34. With the connection, the second crude oil stored in the crude oil tank 30 is supplied to the absorber 16 via the pipe L34. In addition, the crude oil tank 30 is preferably connected to the absorber 16 via a pipe L36 for recovering the second crude oil that absorbed the volatile organic compounds. With the configuration, the second crude oil can be circulated between the absorber 16 and the crude oil tank 30, which allows effective use of the second crude oil.

Furthermore, the absorber 16 is preferably connected with a pipe L14 which emits the gas after absorbing the volatile organic compounds.

According to the recovery system 10 of the embodiment, the volatile organic compounds can be absorbed by the second crude oil in the absorber 16, thereby suppressing the emissions of volatile organic compounds to atmosphere and allowing effective use of resources. The content of the volatile organic compounds in the second crude oil is preferably smaller than the content of the volatile organic compounds in the first crude oil. This leads to increase the absorption efficiency of volatile organic compounds.

The method for recovering the volatile organic compounds according to the embodiment is favorably executed using the above recovery system 10. According to the recovery method, the gas G generated from the crude oil tanker 2 and the second crude oil supplied from the crude oil tank 30 are supplied to the absorber 16, and the volatile organic compounds in the gas G are absorbed into the second crude oil. By increasing the internal pressure of the absorber 16 and by cooling the contents of the absorber 16, the volatile organic compounds can be efficiently absorbed into the second crude oil. The condition of inside of the absorber 16 may be kept to normal temperature and pressure. The gas G and the second crude oil are supplied to the absorber 16 by, for example, the following procedure.

The gas G reaches the loading arm 4 via the pipe L2. Then, the gas G is supplied to the absorber 16 via the pipe L4. The concentration of volatile organic compounds in the gas G passing through the pipe L4 is, for example, 22.7% by volume. The concentration can be determined by, for example, gas chromatography. Meanwhile, the second crude oil is supplied to the absorber 16 via the pipe L34.

According to the method for recovering volatile organic compounds of the embodiment, the volatile organic compounds can be absorbed by the second crude oil in the absorber 16, thereby suppressing the emissions of volatile organic compounds to atmosphere and allowing effective use of resources.

In addition, the gas emitted from the absorber 16 via the pipe L14 is preferably treated further by, for example, absorption by crude oil, combustion, adsorption, and the like. The concentration of volatile organic compounds in the gas passing through the pipe L14 is, for example, 4% by volume.

Further, the second crude oil is preferably circulated between the absorber 16 and the crude oil tank 30. By the circulation, the second crude oil can be effectively used. The second crude oil is supplied from the crude oil tank 30 to the absorber 16 via the pipe L34, followed by recycling from the absorber 16 to the crude oil tank 30 via the pipe L36.

The time required to return the second crude oil from the absorber 16 to the crude oil tank 30 is preferably 7 minutes or smaller, more preferably 6 minutes or smaller, and most preferably 5 minutes or smaller. If the time exceeds 7 minutes, the volatile organic compounds which were absorbed into the second crude oil tend to re-gasify.

Furthermore, on circulating the second crude oil, the number of days for using the second crude oil is preferably in a range from 15 to 60 days, more preferably from 17 to 55 days, and most preferably from 19 to 52 days. If the number of days exceeds 60, the absorption efficiency of the volatile organic compounds tends to decrease. If the number of days is smaller than 15, the use amount of the second crude oil increases, which trend to increase the cost.

A preferred embodiment of the present invention is described above in detail. However, the present invention is not limited to the above embodiment.

The recovery system for volatile organic compounds and the method for recovering volatile organic compounds relating to the above embodiment are preferably used at, for example, a petroleum stockpiling base or a crude oil shipment base. As of the petroleum stockpiling base, a base having no refinery in surrounding area, (also referred to as the "base not-combining with refinery"), is preferred.

At a petroleum stockpiling base or a crude oil shipment base, when a conventionally and frequently used absorbent (kerosene and the like) is applied, the absorbent has to be transported from refinery in large amounts. In addition, the absorbent after absorbing the volatile organic compounds becomes out of the specification of properties, thus failing to use as the product, thereby needing to transfer to the refinery by a tanker to undergo refining again at the refinery. As a result, the transportation expenses and the purification expenses are generated to deteriorate the economy.

On the other hand, when the second crude oil is used, a crude oil stored at a petroleum stockpiling base or the like can be utilized. In addition, the second crude oil after absorbing the volatile organic compounds is required only to undergo the ordinary refining at a refinery which is the destination. As a result, the scheme is superior in economy because of generating no specific expense.

EXAMPLES

The present invention is described below in more detail referring to the examples. However, the present invention is not limited to the examples.

The crude oils 1 to 3, given in Table 1, were prepared for executing experiment.

TABLE 1

|  | Crude oil 1 | Crude oil 2 | Crude oil 3 |
|---|---|---|---|
| Crude oil name | MUB (Murban) | ALT (Arabian light) | RTW (Ratawi) |
| API gravity | 39.6 | 33.3 | 24.9 |
| Pour point [° C.] | −12.5 | −47.5 | −20.0 |
| Dynamic viscosity at 50° C. [mm$^2$/s] | 2.40 | 5.16 | 21.63 |

Example 1

By supplying the gas G containing volatile organic compounds and the crude oil 1 to the absorber 16, the volatile organic compounds were recovered.

Example 2

The volatile organic compounds were recovered in a similar procedure to that of Example 1 expect for using the crude oil 2 instead of the crude oil 1.

Example 3

The volatile organic compounds were recovered in a similar procedure to that of Example 1 expect for using the crude oil 3 instead of the crude oil 1.

Experimental Results

The experimental results of Examples 1 to 3 are given in Table 2.

TABLE 2

|  | Example 1 | Example 2 | Example 3 |
|---|---|---|---|
| VOC concentration at inlet of the absorber 16 [% by volume] | 36.5 | 36.5 | 36.5 |
| Internal temperature of the absorber 16 [° C.] | 23 | 23 | 23 |
| Internal pressure of the absorber 16 [Pa] | $9.8 \times 10^4$ | $9.8 \times 10^4$ | $9.8 \times 10^4$ |
| Contact time [sec] | 60 | 60 | 60 |
| Gas-liquid ratio [L/Nm$^3$] | 100 | 100 | 100 |
| VOC concentration at outlet of the absorber 16 [% by volume] | 23.0 | 21.1 | 20.1 |
| VOC recovery rate [%] | 37.1 | 42.2 | 45.0 |
| VOC recovery amount [ton] | 8660 | 9850 | 10504 |

Then, VOC1 and VOC2, given in Table 3, were prepared to execute experiment.

TABLE 3

|  | VOC1 Component ratio [% by volume] | VOC2 Component ratio [% by volume] |
|---|---|---|
| $CH_4$ | 0.1 | 0.9 |
| $C_2H_6$ | 0.3 | 1.5 |
| $C_3H_8$ | 3.6 | 8.9 |
| $C_4H_{10}$ | 28.4 | 30.2 |
| $C_5H_{12}$ | 54.2 | 45.9 |

TABLE 3-continued

|  | VOC1 Component ratio [% by volume] | VOC2 Component ratio [% by volume] |
|---|---|---|
| $C_6H_{14}$ | 12.4 | 11.6 |
| $C_7H_{16}$ | 1.0 | 1.0 |

Example 4

By supplying the gas G containing VOC1 shown in Table 3 as the volatile organic compounds and the Arabian light crude oil to the absorber 16, the volatile organic compounds were recovered. The operational conditions were 23° C. of internal temperature of absorber 16, $9.8 \times 10^4$ Pa of internal pressure of absorber 16, 60 seconds of contact time, 100 L/Nm³ of gas-liquid ratio, and 2 minutes of required time for recycling from the absorber 16 to the crude oil tank 30. The applied Arabian light crude oil was that after holding for 20 days after refilling the crude oil tank 30.

Example 5

The volatile organic compounds were recovered in a similar procedure to that of Example 4 expect for using Ratawi crude oil instead of Arabian light crude oil and for setting the internal temperature of the absorber 16 to 34° C.

Example 6

The volatile organic compounds were recovered in a similar procedure to that of Example 4 expect for setting the time for recycling from the absorber 16 to the crude oil tank 30 as 4 minutes.

Example 7

The volatile organic compounds were recovered in a similar procedure to that of Example 4 expect for using the gas G containing VOC2 instead of VOC1 as the volatile organic compounds, and for setting 30 seconds of contact time.

Example 8

The volatile organic compounds were recovered in a similar procedure to that of Example 4 expect for using the Arabian light crude oil after holding for 35 days after refilling the crude oil tank 30.

Example 9

The volatile organic compounds were recovered in a similar procedure to that of Example 4 expect for using North West Condensate (60.7 of API gravity) instead of Arabian light crude oil.

Example 10

The volatile organic compounds were recovered in a similar procedure to that of Example 4 expect for setting the time for recycling from the absorber 16 to the crude oil tank 30 as 10 minutes.

Example 11

The volatile organic compounds were recovered in a similar procedure to that of Example 4 expect for using the Arabian light crude oil after holding for 90 days after refilling the crude oil tank 30.

Example 12

The volatile organic compounds were recovered in a similar procedure to that of Example 4 expect for setting 5 seconds of contact time and 5 L/Nm³ of gas-liquid ratio.

Experimental Results

The experimental results of Examples 4 to 8 are given in Table 4.

TABLE 4

|  | Example 4 | Example 5 | Example 6 | Example 7 | Example 8 |
|---|---|---|---|---|---|
| VOC concentration at inlet of the absorber 16 [% by volume] | 36.5 | 36.5 | 36.5 | 36.5 | 36.5 |
| Internal temperature of the absorber 16 [° C.] | 23 | 34 | 23 | 23 | 23 |
| Internal pressure of the absorber 16 [Pa] | $9.8 \times 10^4$ | $9.8 \times 10^4$ | $9.8 \times 10^4$ | $9.8 \times 10^4$ | $9.8 \times 10^4$ |
| Contact time [sec] | 60 | 60 | 60 | 30 | 60 |
| Gas-liquid ratio [L/Nm³] | 100 | 100 | 100 | 70 | 100 |
| VOC concentration at outlet of the absorber 16 [% by volume] | 21.1 | 23.4 | 24.3 | 25.0 | 24.8 |
| Time required for recycling from the absorber 16 to the crude oil tank 30 [min] | 2 | 2 | 4 | 2 | 2 |
| Number of days for using the crude oil after refilling the crude oil tank 30 [days] | 20 | 20 | 20 | 20 | 35 |
| VOC recovery rate [%] | 42.2 | 36.0 | 33.3 | 31.5 | 32.0 |
| VOC recovery amount [ton] | 9850 | 8390 | 7760 | 7340 | 7460 |

The experimental results of Examples 9 to 12 are given in Table 5.

TABLE 5

|  | Example 9 | Example 10 | Example 11 | Example 12 |
|---|---|---|---|---|
| VOC concentration at inlet of the absorber 16 [% by volume] | 36.5 | 36.5 | 36.5 | 36.5 |
| Internal temperature of the absorber 16 [° C.] | 23 | 23 | 34 | 23 |
| Internal pressure of the absorber 16 [Pa] | $9.8 \times 10^4$ | $9.8 \times 10^4$ | $9.8 \times 10^4$ | $9.8 \times 10^4$ |
| Contact time [sec] | 60 | 60 | 60 | 5 |
| Gas-liquid ratio [L/Nm³] | 100 | 100 | 100 | 5 |
| VOC concentration at outlet of the absorber 16 [% by volume] | 36.1 | 28.3 | 30.1 | 33.7 |
| Time required for recycling from the absorber 16 to the crude oil tank | 2 | 10 | 2 | 2 |
| Number of days for 30 [min] using the crude oil after refilling the crude oil tank 30 [days] | 20 | 20 | 90 | 20 |
| VOC recovery rate [%] | 1.2 | 22.5 | 17.6 | 7.8 |
| VOC recovery amount [ton] | 280 | 5240 | 4100 | 1820 |

The invention claimed is:

1. A method for recovering volatile organic compounds, comprising the steps of:
   supplying a gas which is generated from a first crude oil and which contains volatile organic compounds, and a second crude oil, to an absorber, thereby absorbing the volatile organic compounds in the gas into the second crude oil; and
   circulating the second crude oil that has passed through the absorber back to a crude oil supply source to be fed back into the absorber.

2. The method for recovering volatile organic compounds according to claim 1, wherein API gravity of the second crude oil is in a range from 18 to 45.

3. The method for recovering volatile organic compounds according to claim 1, wherein a number of days for using the second crude oil is in a range from 15 to 60 days.

4. The method for recovering volatile organic compounds according to claim 1, wherein a time required to return the second crude oil from the absorber to the crude oil supply source is seven minutes or smaller.

5. The method for recovering volatile organic compounds according to claim 1, wherein a content of the volatile organic compounds in the second crude oil is smaller than a content of the volatile organic compounds in the first crude oil.

6. The method for recovering volatile organic compounds according to claim 1, wherein the absorber comprises a packing.

7. The method for recovering volatile organic compounds according to claim 1, wherein a contact time in the absorber is in a range from 10 seconds to 10 minutes.

8. The method for recovering volatile organic compounds according to claim 1, wherein an internal temperature of the absorber is $\leqq 40°$ C.

9. The method for recovering volatile organic compounds according to claim 1, wherein an internal pressure of the absorber is $\geqq 9.8 \times 10^4$ Pa.

10. The method for recovering volatile organic compounds according to claim 1, wherein a ratio of a volume of the second crude oil at 15° C. to a volume of the gas in 0° C. at 1 atm is in a range from 10 to 200 L/Nm³.

11. A method for recovering volatile organic compounds, comprising the steps of:
    supplying a gas which is generated from a first crude oil, and which contains volatile organic compounds, to an absorber,
    supplying a second crude oil to the absorber, the second crude oil absorbing the volatile organic compounds from the gas; and
    circulating the second crude oil and the volatile organic compounds absorbed in the second crude oil from the absorber back to a crude oil supply source;
    wherein a content of the volatile organic compounds in the second crude oil is smaller than a content of the volatile organic compounds in the first crude oil.

12. A method for recovering volatile organic compounds, comprising the steps of:
    supplying a first crude oil containing volatile organic compounds, from a first crude oil supply source, to a crude oil tanker;
    supplying a gas which is generated from the first crude oil, and which contains volatile organic compounds, from the crude oil tanker to an absorber;
    supplying a second crude oil from a second crude oil supply source, to the absorber, said second crude oil absorbing the volatile organic compounds from the gas in the absorber;
    circulating the second crude oil and the volatile organic compounds absorbed in the second crude oil back to the second crude oil supply source.

13. A recovery system for volatile organic compounds, comprising:
    a first crude oil supply source supplying a first crude oil containing volatile organic compounds to a crude oil tanker;
    a gas supply line supplying a gas which is generated from the first crude oil, and which contains the volatile organic compounds, from the crude oil tanker;
    a second crude oil supply source supplying a second crude oil;
    an absorber, receiving the gas and second crude oil, wherein the second crude oil absorbs the volatile organic compounds from the gas;
    a circulating line circulating the second crude oil and volatile organic compounds back to the second crude oil supply source.

* * * * *